United States Patent
Li et al.

(10) Patent No.: US 11,704,229 B1
(45) Date of Patent: Jul. 18, 2023

(54) AUTO-INTRUSIVE DATA PATTERN AND TEST CASE GENERATION FOR SYSTEM VALIDATION

(71) Applicant: Amazon Technologies, Inc., Seattle, WA (US)

(72) Inventors: Huang Li, Seattle, WA (US); Yuk Lun Patrick Kwan, Bellevue, WA (US); Gary Rittinger, Kent, WA (US)

(73) Assignee: Amazon Technologies, Inc., Seattle, WA (US)

( * ) Notice: Subject to any disclaimer, the term of this patent is extended or adjusted under 35 U.S.C. 154(b) by 50 days.

(21) Appl. No.: 17/038,334

(22) Filed: Sep. 30, 2020

(51) Int. Cl.
  *G06F 9/44* (2018.01)
  *G06F 11/36* (2006.01)
(52) U.S. Cl.
  CPC ...... *G06F 11/3684* (2013.01); *G06F 11/3688* (2013.01); *G06F 11/3692* (2013.01)
(58) Field of Classification Search
  CPC ............ G06F 11/3684; G06F 11/3688; G06F 11/3692
  See application file for complete search history.

(56) References Cited

U.S. PATENT DOCUMENTS

| | | | |
|---|---|---|---|
| 10,628,243 B1 * | 4/2020 | Cramer | G06F 16/953 |
| 2018/0308132 A1 * | 10/2018 | Sharma | G06Q 30/0269 |
| 2019/0363961 A1 * | 11/2019 | Lemmons | H04L 43/0852 |
| 2020/0110695 A1 * | 4/2020 | Maciel | G06F 11/3688 |
| 2020/0233776 A1 * | 7/2020 | Richards | G06F 11/3692 |
| 2020/0366588 A1 * | 11/2020 | Bergeron | H04L 43/065 |

OTHER PUBLICATIONS

"Chaos Engineering," Wikipedia, retrieved from https://en.wikipedia.org/wiki/Chaos_engineering on Aug. 21, 2020, 7 pages.
"Principles of Chaos Engineering," retrieved from https://principlesofchaos.org/ on Sep. 25, 2020, 2 pages.

* cited by examiner

*Primary Examiner* — Chat C Do
*Assistant Examiner* — Lenin Paulino
(74) *Attorney, Agent, or Firm* — Nicholson De Vos Webster & Elliott LLP

(57) ABSTRACT

Techniques for auto-intrusive data pattern and test case generation for negative service testing are described. A test engine obtains negative test information specifying negative test input examples or schemas associated with tests that are expected to fail. A test generator generates multiple test cases based on the negative test information. A test execution orchestrator splits each test case up into actions that are inserted into queues, where workflow execution agents perform the tests by reading from the queues and interacting with services. The tests may also include adjusting a rate of transactions allowed between top-level services and/or downstream services. Results from the testing are analyzed by a test analysis engine and used to inform the services or the test originator of test cases where the expected failures did not arise.

17 Claims, 9 Drawing Sheets

POSITIVE TEST CONFIG. 402

```
{
    "service":"AlphaService",
    "operation":"CreateAccount",
    "input":{
        "GroupCode":"ABCD"
    },
    "isNegativeTesting":false,
    "expectedException":null
}
```

NEGATIVE TEST CONFIG. 406

```
{
    "service":"AlphaService",
    "operation":"CreateAccount",
    "input":{
        "GroupCode":"ABCD?"
    },
    "isNegativeTesting":true,
    "expectedException":"InvalidInputException"
}
```

FIG. 4

AUTO-INTRUSIVE DATA PATTERN AND TEST CASE GENERATION FOR SYSTEM VALIDATION

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, data centers housing significant numbers of interconnected computing systems have become commonplace, such as private data centers that are operated by and on behalf of a single organization, and public data centers that are operated by entities as businesses to provide computing resources to customers. Some public data center operators provide network access, power, and secure installation facilities for hardware owned by various customers, while other public data center operators provide "full service" facilities that also include hardware resources made available for use by their customers. However, as the scale and scope of typical data centers has increased, the tasks of provisioning, administering, and managing the physical computing resources have become increasingly complicated. For example, many modern applications are architected as a set of "services" or "micro-services" implemented in a cloud environment, and the ability to test and troubleshoot such applications is tremendously difficult.

BRIEF DESCRIPTION OF DRAWINGS

Various embodiments in accordance with the present disclosure will be described with reference to the drawings, in which:

FIG. 4 is a diagram illustrating exemplary user-provided positive and negative testing configurations according to some embodiments.

DETAILED DESCRIPTION

Figure 1:
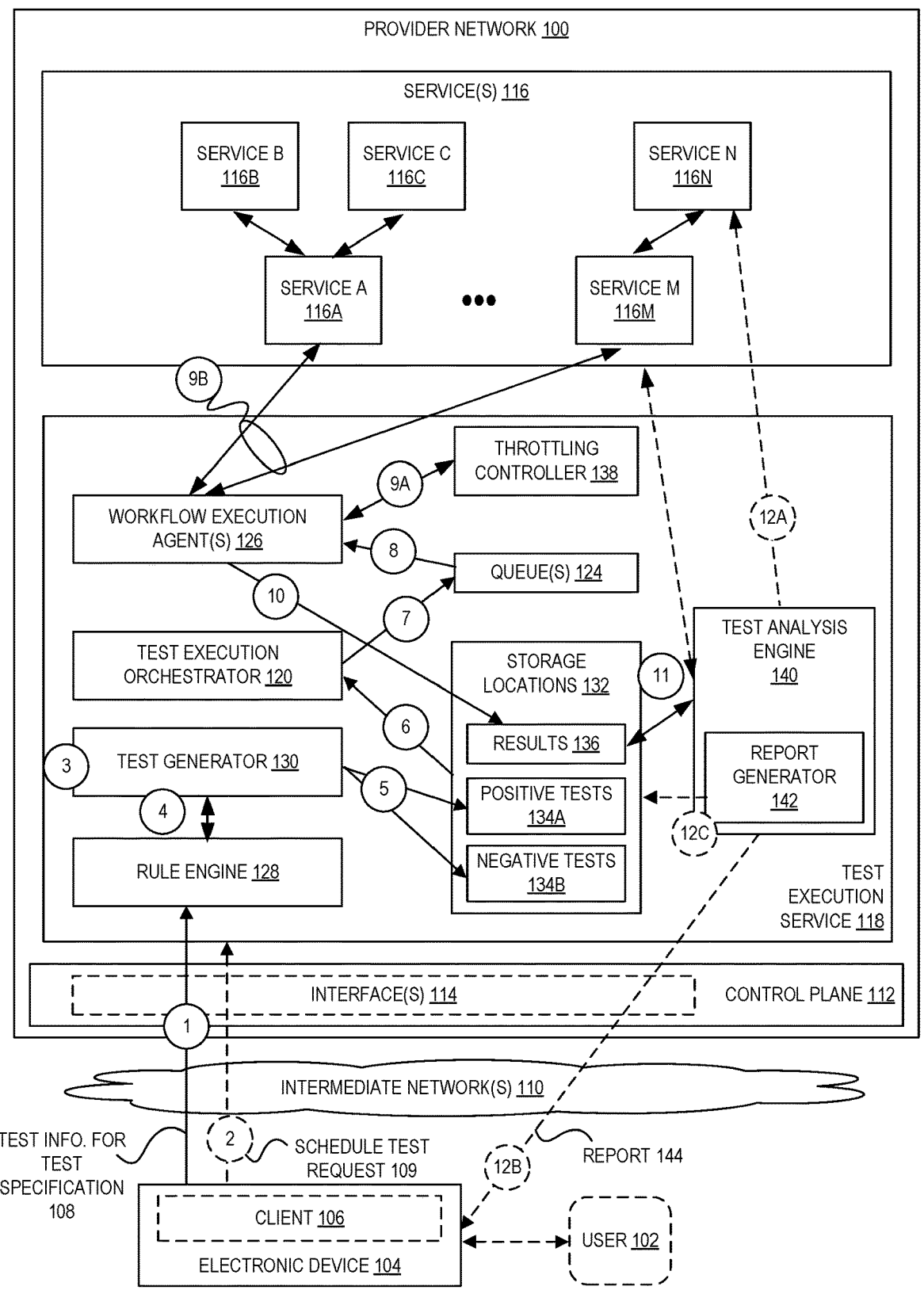
FIG. 1 is a diagram illustrating an environment for auto-intrusive data pattern and test case generation for negative service testing according to some embodiments.

The present disclosure relates to methods, apparatus, systems, and non-transitory computer-readable storage media for auto-intrusive data pattern and test case generation for negative service testing. According to some embodiments, a test execution service generates multiple test cases for testing an application made up of one or more services, where the multiple test cases include both positive tests anticipated to cause the application to perform successfully and negative tests anticipated to cause the application to fail to perform successfully. A user may provide a schema and/or examples of valid and/or invalid input data to be provided as part of the test generation, which a test generator of the test execution service may use to generate the multiple test cases for one or more workflows. The execution of the multiple tests may thus include providing valid input data to one or more application components (e.g., implemented as services) and/or invalid input data to the one or more application components. The execution of test cases may also include adjusting a bandwidth of transactions between application components—such as between a first service (e.g., being called by the test execution service) and one or more of its dependent services (e.g., a second service, third service, or the like)—to ensure that the components can handle periodic and/or continual throttling or denial of service scenarios. Results generated by the test execution (e.g., responses sent back by components/services under test) can be obtained and analyzed based on what expected output—whether erroneous or valid—was anticipated, and particular components can be identified as being problematic. The test execution service may thus notify these services, administrators or developers associated with those services, and/or users who submitted the testing as to what components are performing incorrectly or detrimentally, what tests failed (and/or succeeded), and the specific details of the tests to allow for the problematic behaviors to be remedied or otherwise handled.

The testing of computerized applications is an increasingly important part of the application development process. Testing is an essential process by which the usability and performance of an application can be evaluated to ensure the delivery of a high-quality product to its end-users. At various stages in the development cycle, a suite of tests may be run to verify the expected operation of an application. The suite of tests may include, for example, tests to verify that the application is performing as expected. As described herein, an application may refer to a function—or often, a group of such functions—each of which can be a portion of code, a compiled or interpreted application, a set of procedures or routines, etc., that can be run or executed using one or more computing resources such as those provided in a provider network.

Application testing can be performed during various phases of the application development process. For example, application testing can be performed when developers add new features to an application. However, testing the functionality of an application typically requires insight into the interactions between multiple systems (e.g., components implemented as services according to a service-oriented architecture) that provide data for the application.

For example, multiple network-connected services may collectivity operate as part of an application, where a first service may call one or more "dependent" services to obtain or process data. For example, the execution of a first service on a computer may depend on one or multiple dependency services, and any dependency service also may depend on one or more multiple dependency services, which also may be referred to as dependency services of the first service. Therefore, a computer service may be a dependency service of another service and may depend on other dependency services. For example, a first service may depend on a second service, and the second service may depend on a third service. The execution of the third service may allow execution of the second service, which may allow execution of the first service. Therefore, the first service is dependent on the second and third services, and the second service is dependent on the third service.

These services may be implemented in different locations, such as by different compute instances of a provider network that may possibly be distributed at multiple locations. Accordingly, these services commonly are communicatively coupled via network links, and communicate using network traffic such as via use of application programming interface (API) calls over TCP/IP, e.g., using HTTP messages that carry method calls and responses thereto. Accordingly, network issues and/or the failure of individual components of an application can affect the functioning of the whole application, such as when one service's failure affects other services that rely upon it.

Moreover, applications may be designed with exposed interfaces (e.g., APIs) that require particular types of input data, but these applications may potentially not ensure that the correct type of input data is actually being provided. Thus, invalid input may be provided to a service that is not detected by that service (or, downstream services of it) that leads to incorrect processing and associated results, which may be appear to be valid but in fact are not. For example, an invalid input value may be sent to a service that is relied upon by the service to perform a lookup into a database, and the lookup may not find any associated record due to the invalidity of the input value—as a result, the response may appear proper and indicate that no records were found, when in fact, one or more records may actually exist that are associated with the intended input value.

It is particularly difficult to test applications' ability to handle service unavailability issues, also referred to herein as "degraded mode" performance, where a service may not be able to respond (e.g., to a calling service) in a reasonable amount of time (or at all) for some number of requests. In some cases, a calling service may attempt to insulate its caller from this failure—such as in time-sensitive contexts—by using cached data (from previous calls) or estimated data when it cannot get actual, live data from a downstream service. In these cases, the failures (and potentially the use of incorrect data) is effectively obscured from a client.

Moreover, it is also difficult to detect cases in which a service is not detecting invalid input data as being invalid, whether it be a service that receives requests from end users (clients) or a downstream service that receives requests from an upstream service. In these cases, the service—or services—may proceed with typical workflow processing with invalid input, rendering the entire processing faulty, though this may not be easily detected by end users.

Accordingly, embodiments disclosed herein provide a system for the automated generation of test cases including both one or more positive tests (e.g., with proper inputs and operating conditions, where positive processing is expected to occur) and one or more—and typically many—negative tests where processing is expected to fail, whether due to invalid input data (e.g., "abnormal behavior" testing), inter-service communication issues (e.g., "degraded mode" testing), or combinations of both. In some embodiments, users seeking to test an application can opt in to performing such "negative" testing and may provide simple inputs to enable complex negative testing to be carried out. The testing may be performed on demand (e.g., responsive to a user's request to perform the testing), on a scheduled or periodic basis (e.g., once a day or week), responsive to events (e.g., as part of a continuous integration (CI)/continuous delivery (CD) pipeline, a build occurring, etc.), or combinations thereof. When a failure of a negative test is detected, the involved service(s) can be notified and/or a comprehensive set of reports can be generated and provided to an associated user indicating what tests succeed, what tests failed, how/why the tests failed, what involved components failed, and the like.

FIG. 1 is a diagram illustrating an environment for auto-intrusive data pattern and test case generation for negative service testing according to some embodiments. In some embodiments, a provider network 100 provides a test execution service 118 for testing applications provided by the provider network. In some embodiments, the test execution service 118 comprises one or more components such as a test execution orchestrator 120, a set of queues 124, a rule engine 128, a test generator 130, throttling controller 138, and a set of workflow execution agents 126. These components may be implemented as software, hardware, or a combination of both using one or more multiple computing devices located at one or more multiple locations in the provider network 100. Moreover, ones of these components may be implemented "on top" of other services of a provider network, such as via use of a hardware virtualization service or a "serverless" on-demand code execution service (e.g., to implement the rule engine 128, test generator 130, text execution orchestrator 120, throttling controller 138, test analysis engine 140, and/or workflow execution agents 126), a database service and/or an object storage service (e.g., to implement storage locations 132 used by the test execution service 118), a queue service (e.g., to implement the queues 124), or the like.

A provider network 100 (or, "cloud" provider network) provides users with the ability to utilize one or more of a variety of types of computing-related resources such as compute resources (e.g., executing virtual machine (VM) instances and/or containers, executing batch jobs, executing code without provisioning servers), data/storage resources (e.g., object storage, block-level storage, data archival storage, databases and database tables, etc.), network-related resources (e.g., configuring virtual networks including groups of compute resources, content delivery networks (CDNs), Domain Name Service (DNS)), application resources (e.g., databases, application build/deployment services), access policies or roles, identity policies or roles, machine images, routers and other data processing resources, etc. These and other computing resources may be provided as services 116, such as a hardware virtualization service that can execute compute instances, a storage service that can store data objects, etc. The users 102 (or "customers") of provider networks 100 may utilize one or more user accounts that are associated with a customer account, though these terms may be used somewhat interchangeably depending upon the context of use. Users 102 may utilize electronic devices 104 (e.g., that execute software clients 106) to interact with a provider network 100 across one or more intermediate networks 110 (e.g., the internet) via one or more interface(s) 114, such as through use of application programming interface (API) calls, via a console implemented as a website or application, etc.

An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another. The interface(s) 114 may be part of, or serve as a front-end to, a control plane 112 of the provider network 100 that includes "backend" services supporting and enabling the services that may be more directly offered to customers.

Accordingly, a cloud provider network (or just "cloud") typically refers to a large pool of accessible virtualized computing resources (such as compute, storage, and networking resources, applications, and services). A cloud can provide convenient, on-demand network access to a shared pool of configurable computing resources that can be programmatically provisioned and released in response to customer commands. These resources can be dynamically provisioned and reconfigured to adjust to variable load. Cloud computing can thus be considered as both the applications delivered as services over a publicly accessible network (e.g., the Internet, a cellular communication network) and the hardware and software in cloud provider data centers that provide those services.

Generally, the traffic and operations of a provider network may broadly be subdivided into two categories: control plane operations carried over a logical control plane and data plane operations carried over a logical data plane. While the data plane represents the movement of user data through the distributed computing system, the control plane represents the movement of control signals through the distributed computing system. The control plane generally includes one or more control plane components distributed across and implemented by one or more control servers. Control plane traffic generally includes administrative operations, such as system configuration and management (e.g., resource placement, hardware capacity management, diagnostic monitoring, system state information). The data plane includes customer resources that are implemented on the provider network (e.g., computing instances, containers, block storage volumes, databases, file storage). Data plane traffic generally includes non-administrative operations such as transferring customer data to and from the customer resources. The control plane components are typically implemented on a separate set of servers from the data plane servers, and control plane traffic and data plane traffic may be sent over separate/distinct networks.

To provide these and other computing resource services, provider networks 100 often rely upon virtualization techniques. For example, virtualization technologies may be used to provide users the ability to control or utilize compute resources (e.g., a "compute instance" such as a VM using a guest operating system (O/S) that operates using a hypervisor that may or may not further operate on top of an underlying host O/S, a container that may or may not operate in a VM, a compute instance that can execute on "bare metal" hardware without an underlying hypervisor), where one or multiple compute resources can be implemented using a single electronic device. Thus, a user may directly utilize a compute resource (e.g., provided by a hardware virtualization service) hosted by the provider network to perform a variety of computing tasks. Additionally, or alternatively, a user may indirectly utilize a compute resource by submitting code to be executed by the provider network (e.g., via an on-demand code execution service), which in turn utilizes one or more compute resources to execute the code—typically without the user having any control of or knowledge of the underlying compute instance(s) involved.

For example, in various embodiments, a "serverless" function may include code provided by a user or other entity—such as the provider network itself—that can be executed on demand Serverless functions may be maintained within provider network 100 by an on-demand code execution service and may be associated with a particular user or account or be generally accessible to multiple users/accounts. A serverless function may be associated with a Uniform Resource Locator (URL), Uniform Resource Identifier (URI), or other reference, which may be used to invoke the serverless function. A serverless function may be executed by a compute resource, such as a virtual machine, container, etc., when triggered or invoked. In some embodiments, a serverless function can be invoked through an API call or a specially formatted HyperText Transport Protocol (HTTP) request message. Accordingly, users can define serverless functions that can be executed on demand, without requiring the user to maintain dedicated infrastructure to execute the serverless function. Instead, the serverless functions can be executed on demand using resources maintained by the provider network 100. In some embodiments, these resources may be maintained in a "ready" state (e.g., having a pre-initialized runtime environment configured to execute the serverless functions), allowing the serverless functions to be executed in near real-time.

An on-demand code execution service (referred to in various embodiments as a function compute service, functions service, cloud functions service, functions as a service, or serverless computing service) can enable customers of the provider network 100 to execute their code on cloud resources without having to select or manage the underlying hardware resources used to execute the code. For example, a customer may be able to use an on-demand code execution service by uploading their code and using one or more APIs to request that the service identify, provision, and manage any resources required to run the code.

A hardware virtualization service (referred to in various implementations as an elastic compute service, a virtual machines service, a computing cloud service, a compute engine, or a cloud compute service) can enable users of the provider network 100 to provision and manage compute resources such as virtual machine instances. Virtual machine technology can use one physical server to run the equivalent of many servers (each of which is called a virtual machine), for example using a hypervisor, which may run at least on an offload card of the server (e.g., a card connected via PCI or PCIe to the physical CPUs and other components of the virtualization host may be used for some virtualization management components. Such an offload card of the host can include one or more CPUs that are not available to customer instances, but rather are dedicated to instance management tasks such as virtual machine management (e.g., a hypervisor), input/output virtualization to network-attached storage volumes, local migration management tasks, instance health monitoring, and the like). Virtual machines are commonly referred to as compute instances or simply "instances." As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client.

Turning to FIG. 1, as shown at (1), a user 102 may utilize a client application 106 of an electronic device 104 to generate or update a test specification for testing an application provided by the provider network. As noted above, an application may refer to a function which can be a portion of code, a compiled or interpreted application, a set of procedures or routines, etc., that can be run or executed using one or more computing resources in the provider network. In some embodiments, the test specification may specify one or more actions and the order in which the actions should be performed to test the functionality of the application. In certain examples, the actions may specify one or more pre-conditions that must be fulfilled prior to executing the test specification. In some examples, the actions may specify one or more content validation blocks to be executed as part of validating content generated by the application. For instance, the content validation blocks may specify information related to a type of object whose content is to be validated prior to executing the test specification. For example, a content validation block may identify one or more data fields and a corresponding one or more expected data values related to the type of object to be validated. As an example, a test specification for an invoice application (e.g., an application that generates an invoice for a customer of a provider network based on the customer's usage of computing resources in the provider network) may specify an invoice object to be validated in a content validation block in the test specification. The invoice object may include an object definition that identifies data fields (e.g., bill amount, charge amount, tax amount, credit amount, bill description) and corresponding expected data values to be validated for the invoice object.

In some embodiments, the user 102 may utilize a user interface (UI) of an application provided by the electronic device 104 to generate or update the test specification. The UI may include a text-based UI, a graphical UI (GUI), or a combination of both to enable the user to generate or update the test specification. For example, the user may input text to generate the test specification or may select (e.g., via a mouse or touchscreen) graphical elements to create or update the test specification, or a combination of both.

As part of generating or configuring a test specification, the user 102 may provide test information 108 (e.g., including positive and/or negative test configuration data) for the test specification. The test information 108 in some embodiments includes specific positive testing input examples (i.e., positive test configuration data) and specific negative testing input examples (i.e., negative test configuration data), which could be entered in a text-based format (e.g., an XML or JSON type format), using GUI elements, etc. A positive or negative testing input example may specify, for example, an input value (e.g., alphanumeric data) for an operation (e.g., method or function) provided by a component (e.g., a service), and may also indicate that the testing input example is, in fact, a positive testing sample (in that the component should return with a valid response) or negative testing sample (in that the component should return with an invalid response such as an error message or exception). In the case of a negative testing input example, it may further include an identifier of an error code or exception that is expected to be returned, though this is not used in some embodiments.

Alternatively, or additionally, in some embodiments the test information 108 includes a schema for positive testing input examples and/or negative testing input examples that defines types of inputs that should be valid and/or types of inputs that should not be valid. For example, a positive testing input example schema may indicate that an input value to be passed should be valid when it includes a threshold number of characters, particular types or combinations of characters, etc. As another example, a negative testing input example schema may indicate that a particular input value to be passed will be invalid (and thus, should lead to an error or exception) when it includes a particular number of characters, particular types or combinations of characters, etc.

In some embodiments, the test information 108 may include an identifier of whether inter-component throttling is to be enabled, and if so, may specify specific components or pairs of components that should be throttled. In many systems, a particular interface between two components (e.g., a first service and a second service, where the second service is downstream of the first service and thus the first service issues requests to the second service) may be configured according to a particular transaction rate, such as a "sustained" (e.g., average) number of requests that can (or should) be sent by the first service over a unit of time, and/or a "burst" (e.g., maximum) number of requests that can (or should) be sent by the first service over a unit of time. In some embodiments, these transaction rates are enforced by the recipient (second) service or by the overall system implementing the components (e.g., a provider network). As disclosed herein, in some cases a service may need to deal with partial or complete failures on the part of the network or a downstream service, and thus must be able to handle a non-responsive downstream service or non-returned requests properly. During testing runs, however, this is not traditionally a use case that can be easily tested; however, embodiments herein can "force" such intermittent or persistent failures (from downstream components) via adjusting throttling rates (e.g., allowed transaction rates) to slow down the processing of a downstream service (e.g., by setting a much smaller allowed transaction rate that impacts the upstream service's processing) or completely halt the processing of a downstream service (e.g., by setting a transaction rate to zero).

Continuing with FIG. 1, at circle (1), the test specification may be received by the test execution service 118 via one or more interfaces 114 of the control plane 112. In some embodiments, the test execution service 118 (or components thereof) may be implemented using one or more serverless functions executed by an on-demand code execution service. In some embodiments, the testing information may be provided to a rule engine 128 of the test execution service 118 that can store the testing information and in some embodiments, translate the input into a more formal set of rules/logic corresponding to the user-provided testing information that can be later used (e.g., by the test generator 130, described hereinafter).

In some embodiments, after providing a test specification (including the positive and/or negative testing information described herein), at optional circle (2) the user 102 may cause the client 106 to transmit a schedule test request 109 message indicating that the test should be run immediately, according to a schedule or periodic basis, responsive to a particular event, etc. For example, the user 102 may indicate that the testing is to be immediately performed in an "on-demand" manner, though the user 102 may also indicate that the test is to be run once a day, once a week, etc. As another example, the user 102 may indicate that the testing is to be performed responsive to some particular event, e.g., as part of a CI/CD pipeline upon a stage being reached, a testing build being generated, an updated version of an application being staged, etc.

At some point thereafter, the test is launched and the test generator 130 is invoked at circle (3), which obtains the testing rules at circle (4) from the rule engine 128, and generates multiple testing variants, including negative testing, associated with a targeted application specified by the test specification. For example, a targeted application may include a number of services (or similar components) providing functionality to enable a set of workflows, e.g., a first workflow for creating a new account within the provider network (e.g., via calling a first service), a workflow for causing the new account to "sign in" to the provider network (e.g., via calling a second service), a workflow for causing the new account to purchase a product or subscribe to a service (e.g., via calling a third service), a workflow for causing a sample invoice or bill to be generated for the account (e.g., via calling a fourth service), and the like.

Figure 2:
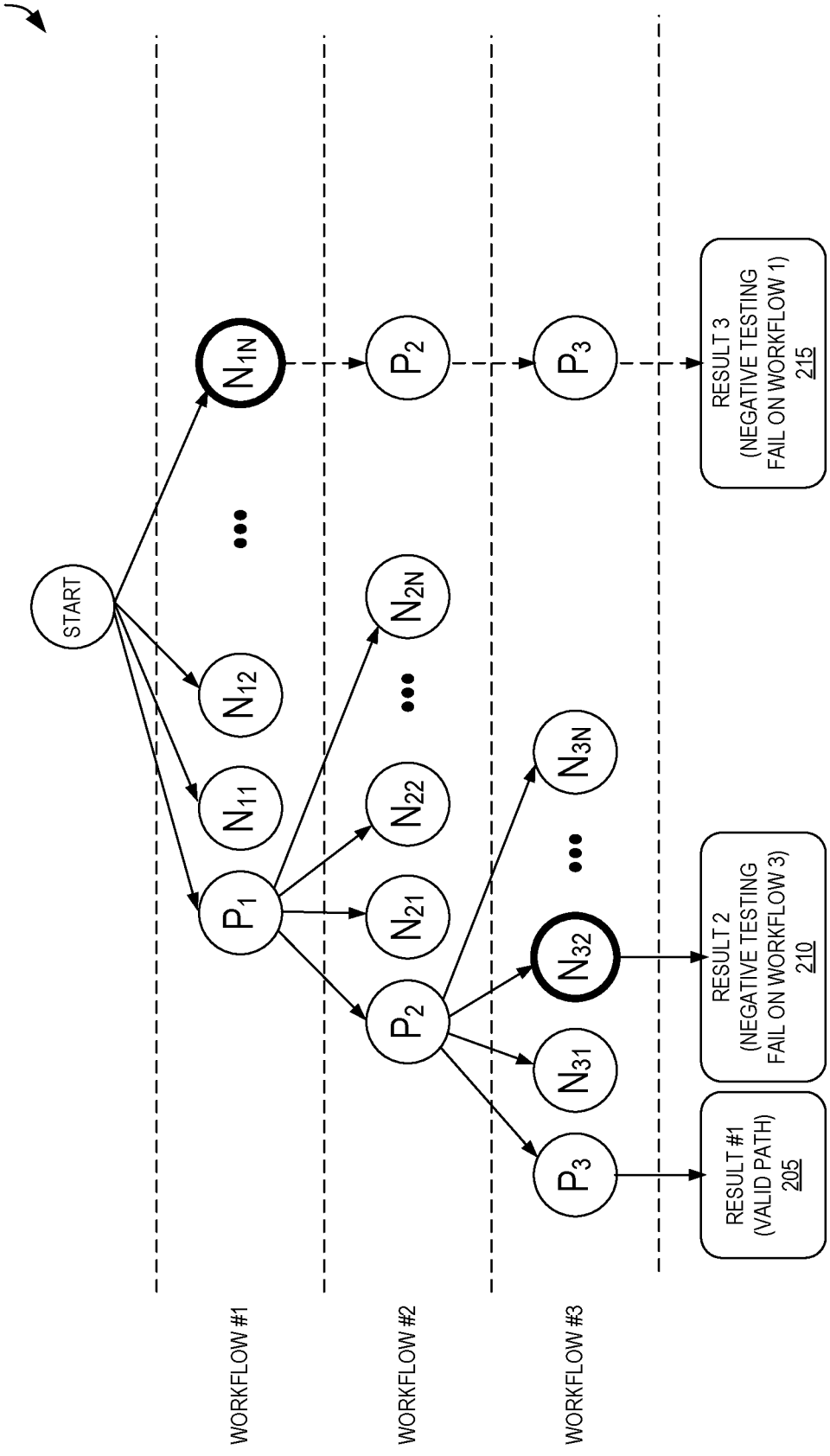
FIG. 2 is a diagram illustrating an exemplary set of generated test cases for positive and negative service testing according to some embodiments.

The generation of multiple testing variants may include generating a number of different test paths, including positive and/or negative tests, for a particular set of workflows. For example, FIG. 2 is a diagram illustrating an exemplary set of generated test cases for positive and negative service testing according to some embodiments. In this example, a test specification may indicate that three different workflows are to be tested. Here, the test generator 130 generates a first test path (shown as P1-P2-P3) providing valid inputs for each workflow (e.g., based on the examples/schema provided by the user), leading to an expected positive overall result (via a "valid path") having a result that can be verified as valid at block 205.

Additionally, the test generator 130 generates multiple other test paths to simulate different types of negative tests at different points in the set of workflows—for example, a second test path (shown as P1-P2-N31) may include a valid input for the first workflow (e.g., a valid input in a call made to a first service), a valid input for the second workflow, but an invalid input for the third workflow that expects a negative result. In this manner, for each workflow, the test generator 130 generates many negative tests along with at least one positive test.

In this example, a third test path (shown as P1-P2-N32) includes a valid input for the first workflow, a valid input for the second workflow, but a different invalid input for the third workflow. For the sake of explanation, we may assume that the invalid (or "negative") test of the third workflow was supposed to return a particular exception, but instead, it returned another result—e.g., another exception, or perhaps a seemingly valid result that does not indicate any exception occurred. In this manner, it can be determined that the result 210 indicates a failure of the component/service providing the third workflow. Similarly, another test path (shown as N1N, and optional P2-P3) may also result in a negative testing failure as determined based on the results 215 (e.g., a result of a call made to a service corresponding to workflow #1, which may not have indicated an expected exception), though this time for the first workflow. In some embodiments, such a negative testing failure where a workflow produces a seemingly valid result (that is improper, as it was supposed to yield a negative result such as an exception) the test may optionally continue via using those results with successive workflow steps.

Turning back to FIG. 1, having generated a number of test cases, at circle (5) the test generator 130 may cause the positive test(s) 134A and negative test(s) 134B to be persisted to a storage location 132, e.g., an object storage location (e.g., a folder or bucket) provided by an object storage service, a database provided by a database service, a filesystem location, etc.

By detecting the persistence of these tests—or, based on being triggered according to a schedule or event—at circle (6) a test execution orchestrator 120 can obtain these tests 134A-134B and cause the workflow(s) to be tested using these negative tests. For example, a test execution orchestrator may identify the order in which actions specified in the tests should be executed and orchestrate the execution of these actions. The actions may include, for example, one or more pre-conditions that must be fulfilled prior to executing the actual tests and/or one or more content validation blocks to be executed as part of validating content generated by the application. For example, upon receiving the tests (e.g., as part of a test specification), at circle (7), the test execution orchestrator 120 may identify a first action to be performed and transmit a message to be placed in a queue 124 (e.g., provided by a queue service) indicating a request to execute the action.

A queue service may implement a plurality of queues 124 that store queued events or messages (which can be requests or other data structures, as described herein). The plurality of queues 124 can be implemented using hardware, as software, or a combination of both. For example, a queue may comprise a region of memory (e.g., Random Access Memory (RAM)) or storage (e.g., a Solid-State Disk (SSD)). A queue could alternatively be a virtual storage entity, such as a bucket or folder, which may be provided by a storage virtualization service. A queue could also comprise a set of tables or records of a database. Other implementations of queues known to those of skill in the art could also be used.

In some embodiments, the queue(s) 124 are a component in the provider network 100 that can receive messages generated or triggered by a variety of entities in the provider network. For instance, as described above, a queue can receive a message from the test execution orchestrator 120 indicating a need to perform a first action. In some embodiments, different queues may store messages associated with different actions (or a group or type of actions) that can be performed to test the application. For example, a first queue 124 may store messages related to a first action, a second queue 124 may store messages related to a second action, a third queue may store messages related to a third action, and so on. In other embodiments, a single queue may be used for storing messages related to all the actions defined.

In some embodiments, the test execution service 118 may include one or more workflow execution agents 126 that obtain messages from the queue(s) 124 and cause them to be distributed and/or processed in a particular manner by associated services 116A-116N. As part of this processing, the workflow execution agents 126 may cause a throttling/adjusting of a transaction bandwidth between services, for example, between a service A 116A and service B 116B for one or more tests. In some embodiments, to affect a throttling, the workflow execution agent 126 may send a command to a throttling controller 138 at circle (9A) to set a throttling limit (e.g., an average/sustained number of transactions that can be performed over a time period, a maximum/burst number of transactions that can be performed over a time period, etc.) that will be enforced by the provider network. The throttling limit may be set to reduce or halt the number of transactions that can be performed. In some embodiments, upon the conclusion of the test (or a portion of the test seeking to test a degraded mode of performance), the workflow execution agent 126 may send another command to the throttling controller 138 to undo the throttle, or change it to a different value.

Thus, upon obtaining a message associated with an action from a queue, the workflow execution agent 126 may communicate with the throttling controller 138 at circle (9A) and/or a desired service (e.g., service A 116A) to execute a desired action at (9B). Upon beginning processing the action or upon the completion of the processing of the action (e.g., by the test execution service or the workflow execution agent itself), the workflow execution agent 126 may cause that message to be removed from the particular queue 124 and may cause a result 136 of the execution of the action (e.g., a response from the associated service) to be provided to a storage location 132 in the provider network 100 at circle (10).

At a conclusion of the testing, and/or according to a schedule or event trigger, a test analysis engine 140 may obtain the results 136 and/or artifact data from one or more services 116 within the provider network 100 that provide one or more artifacts generated by the application. As described herein, an artifact may refer to data provided by the services 116 that comprises data values generated by the application based on the performance of the actions from the testing. For example, the artifacts generated by an "invoice generation" application may include data that corresponds to the actual values associated with the data fields (e.g., bill amount, charge amount, tax amount, credit amount, and description) specified in an object definition for an invoice object type defined in the test specification.

The test analysis engine 140 analyzes the results and/or other artifacts to determine whether the positive and negative tests succeeded, and if not, which tests failed, which components were involved in the failure, etc. For example, in analyzing the results of a positive test, the test analysis engine 140 may determine whether a result from each involved service was typical, i.e., didn't indicate any unexpected errors or exceptions, whether returned values appear appropriate based on the associated inputs provided at that test portion, etc. Similarly, in analyzing the results of a negative test, the test analysis engine 140 may determine whether a result from an involved service matched what was expected, e.g., indicated an error or exception as described by the user-provided testing information.

The test analysis engine 140 may also, in some embodiments, perform an investigation into aspects of a detected issue or degradation. For example, the test analysis engine 140 may identify involved services, their dependencies, and/or interaction requirements thereof (e.g., based on analyzing of service level agreements (SLAs)), and may obtain and analyze various API calls and/or responses between services, monitor service logs, identify errors and corruption based on the criteria defined by SLAs, etc. For example, the test analysis engine 140 may identify an error or corruption (e.g., that information in an API call does not satisfy criteria defined by an SLA), may identify the responder (e.g., the computer service that provided the noncompliant information), may determine one or more dependency services of the responder, and may use the logs of the responder to determine whether the error or corruption occurred based on another API call exchange with a dependency service. The test analysis engine 140 may, for example, search service logs of dependency services until it identifies the source of the error or corruption based on which responding computer service provided the data that violated an SLA.

If a discrepancy is detected between the expected outcome and the actual outcome, the test analysis engine 140 (e.g., via a report generator 142 module) may generate and send a report to a service (or account associated with the service, such as an administrator, owner, or engineer of the service) deemed to have acted improperly detailing the improper action(s), test specifics associated with the failure (e.g., inputs, time of day, conditions), etc., at circle (12A). Alternatively, or additionally, the test analysis engine 140 may also send such a report 144 at circle (12B) to a client 106 of the test-submitting user 102, and/or send the report to a storage location 132 at circle (12C), etc.

The report may be specific to a failed test path (or portion thereof) or include results from all or multiple test paths for a test. For example, the report may indicate a status of each test or test portion, such as "in progress", "failed", and so on, and describe other associated data such as the inputs provided, whether throttling was in place, the date and/or time of the test, etc.

Figure 3:
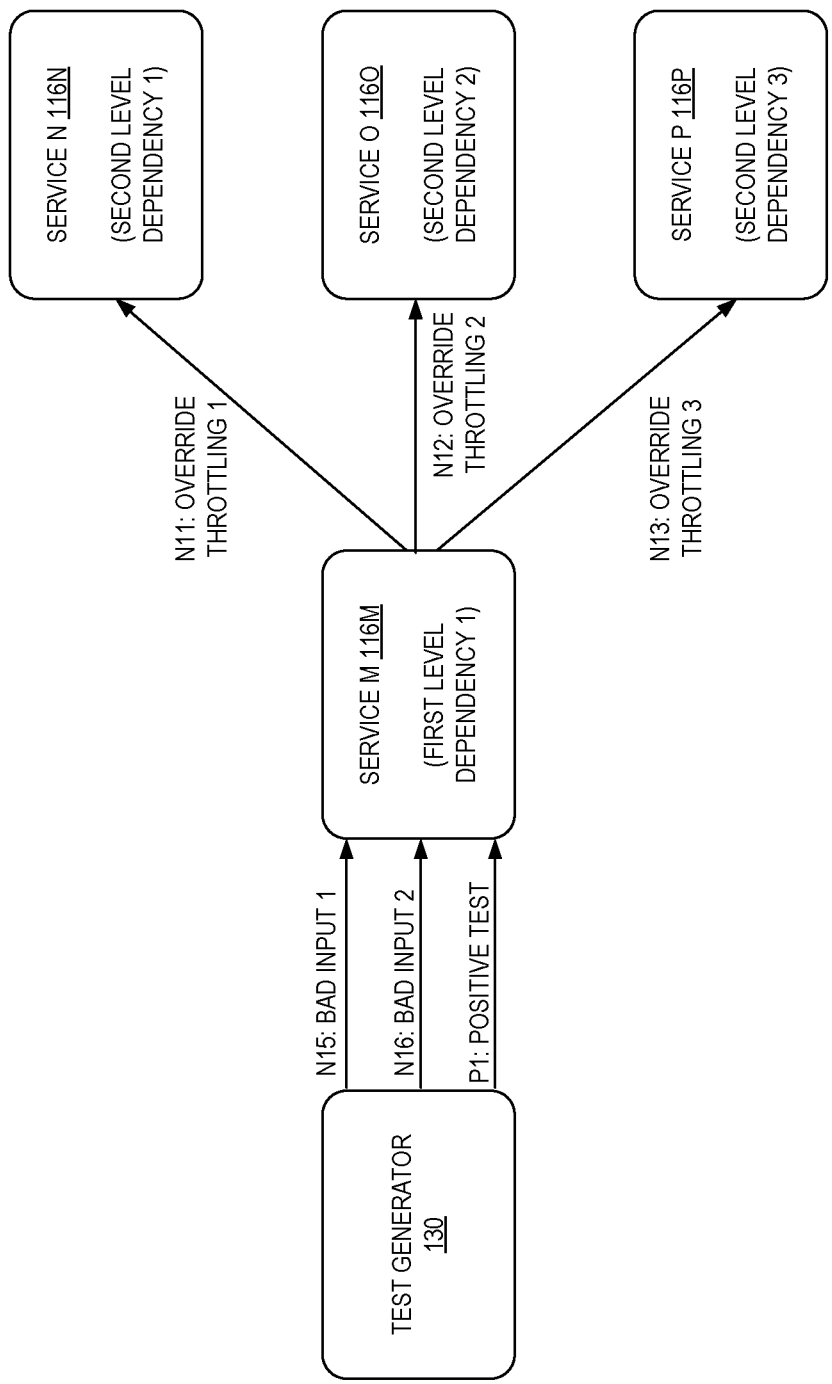
FIG. 3 is a diagram illustrating exemplary positive and negative service testing including invalid inputs and downstream intra-service throttling according to some embodiments.

As indicated above, in some embodiments the negative testing of applications may include throttling via a throttling controller 138. Such throttling may be used at different levels at different times of a single overall test. For example, FIG. 3 is a diagram illustrating exemplary positive and negative service testing including invalid inputs and downstream intra-service throttling according to some embodiments. In this example, the test generator 130 may generate multiple test cases with potentially three different inputs for a first-level service M 116M: N15 representing a first invalid input, N16 representing a second invalid input, and P1 representing a positive "good" input. In this case, the service M 116M may utilize multiple downstream services N-P 116N-116P as part of serving requests, and any of N15/N16/P1 may be tested with or without one or multiple of the throttling tests shown between service M 116M and its downstream services 116N-116P, where a throttling of processing between service M 116M and service N 116N might be throttled a first amount, a throttling of processing between service M 116M and service O 116O might be throttled a second amount, and/or a throttling of processing between service M 116M and service P 116P might be throttled a third amount. Thus, different ones of the inputs can be provided to service M 116M (e.g., N15, N16, and P1) with zero, one, or multiple ones of throttles in place represented by N11, N12, and N13, resulting in many different tests that can find various "edge" error cases.

FIG. 4 is a diagram illustrating exemplary user-provided positive and negative testing configurations according to some embodiments. As described herein, a user may provide one or more positive and/or negative testing samples or schemas for use by the rule engine and test generator to generate tests. These testing samples or schemas may be in the form of test information such as positive test configurations and/or negative test configurations, which identify a service, an operation, and one or more (positive or negative) inputs or schemas. As shown in FIG. 4, a first positive test configuration 402 is shown that identifies a service ("AlphaService") to be tested, an operation (e.g., a method) to be performed (here, "CreateAccount"), and a positive input to be passed (here, a GroupCode of ABCD). The positive test configuration 402 indicates that this is not a negative testing element (and thus, is for a positive test) and that no associated error/exception is expected.

In contrast, a first negative test configuration 406 is illustrated that identifies the same service ("AlphaService") to be tested, the same operation to be performed (here, "CreateAccount"), and a negative input to be passed (here, a GroupCode of ABCD?, where the question mark is known to be an invalid input or the entire string "ABCD?" is known to be invalid). The negative test configuration 406 indicates that this is a negative testing element (via the "isNegativeTesting" key being set to "true") and that an associated error/exception is expected that is an "InvalidInputException".

Figure 5:
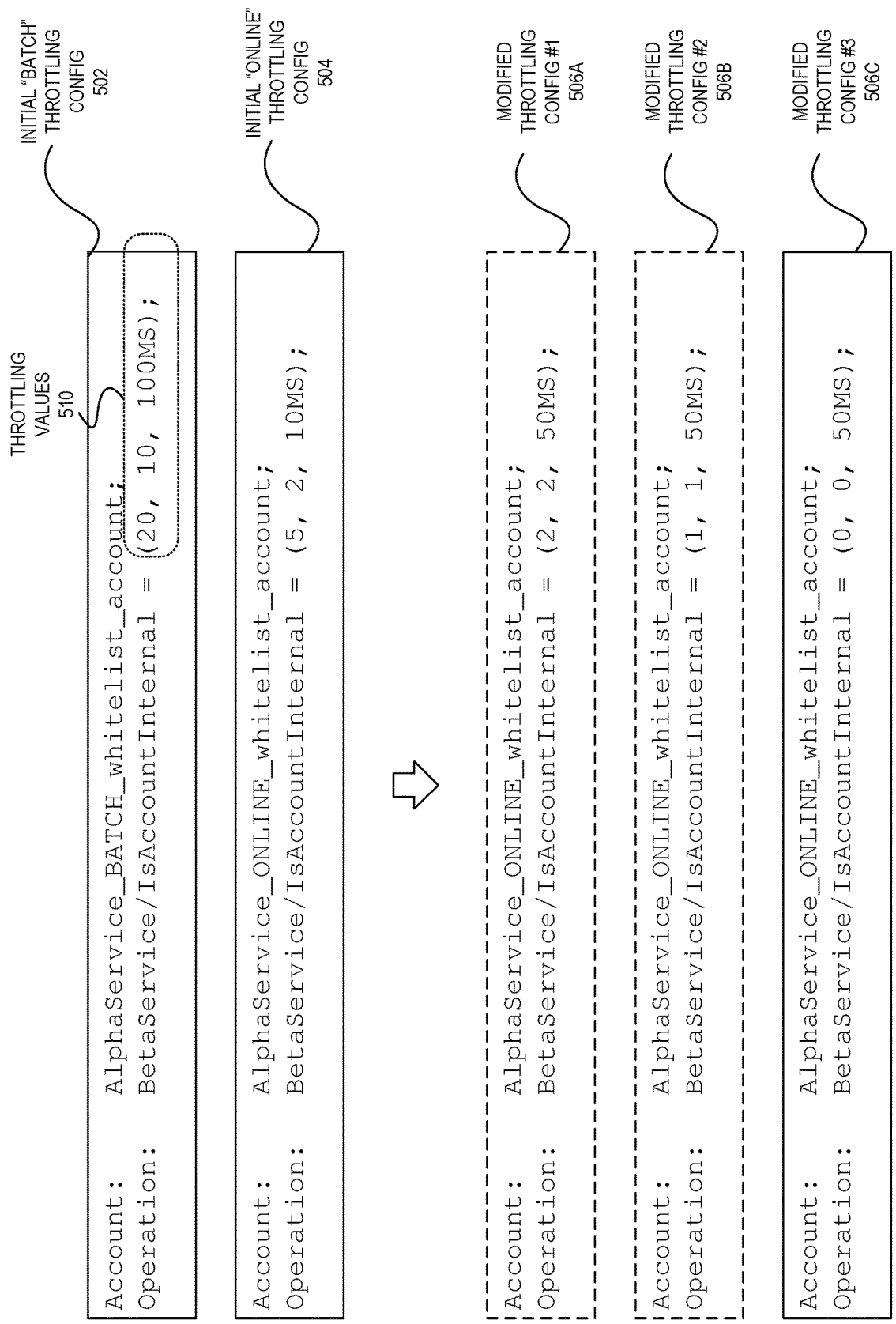
FIG. 5 is a diagram illustrating exemplary standard and modified throttling configurations including throttling values for negative service testing according to some embodiments.

FIG. 5 is a diagram illustrating exemplary standard throttling configurations 502/504 and modified throttling configurations 506 including throttling values 510 for negative service testing according to some embodiments. As disclosed herein, embodiments can cause aspects of a system under test to perform in an abnormal or erroneous state by adjusting an allowable transaction rate between components of the system. For example, in some embodiments a user may specify different throttling rates to change an average/sustained and/or maximum/burst allowable amount of transactions per unit time (e.g., per second or fractions thereof, per minute, etc.) between particular services. To this end, as part of testing information the user may explicitly set a throttling value to be used during some or all of a test (e.g., for particular test paths).

As shown, a first standard throttling configuration 502 may be configured for a particular account associated with a "source" service (AlphaService) as reflected by the account name of AlphaService_BATCH_whitelist_account, which may be utilized to control the transmission of "IsAccountInternal" API requests the account sends (here, in batch) to another "target" service (BetaService). This initial throttling configuration 502 indicates various different throttling values 510—first a maximum/burst amount of transactions that could possibly be served over a unit time (here, twenty) and second an average/sustained amount of transactions over another unit time (here, ten), and a value indicating the particular unit time (here, one hundred milliseconds). Though this embodiment shows the use of three throttling values, it is to be understood that other embodiments may utilize fewer or even more throttling values. Similarly, FIG. 5 illustrates another initial throttling configuration 504 for a different account (also associated with the AlphaService) used to send one-at-a-time requests to the BetaService, and has a burst value of five, a sustained value of two, and a time window of ten milliseconds.

Further, FIG. 5 shows three "degraded" modified throttling configurations 506A-506C corresponding to the online throttling configuration 504. First, modified throttling configuration 506A shows a reduced set of throttling values limiting a burst amount of transactions to two, the sustained amount of transaction to two, and also increases the time window to fifty milliseconds. In some embodiments, this modified throttling configuration 506A allows the system performance to be measured under a first level of service degradation, and optionally the service may be further degraded using a further degraded configuration 506B, which halves both the burst and sustained values to one. The use of one or both of these configurations 506A-506B has the effect of allowing the services to have significantly fewer interactions between each other, effectively simulating an "overloaded" second service. Further, modified throttling configuration 506C shows a reduced set of throttling values completely preventing any transactions from being served by setting both the sustained and burst throttling values to zero. This has the effect of simulating a complete network outage or service failure, forcing the calling service to detect the issue and react accordingly (e.g., perhaps by sending back an error message or exception, retrying the request for some amount of time, etc.). Thus, via the use of multiple levels of throttling, the durability of services can be tested at different levels, for example, to identify particular service degradation levels that cause failures, significant slowdowns, etc.

Notably, as described herein, in some embodiments these invalid inputs, operations, and throttling configurations can be implemented for testing live, production services without affecting legitimate traffic by confining these test operations to usage via "test" accounts that all services understand are low priority and/or are not valid traffic, so they can be handled differently and/or the effects of these operations (e.g., throttling) can be limited to only traffic involving these accounts.

Figure 6:
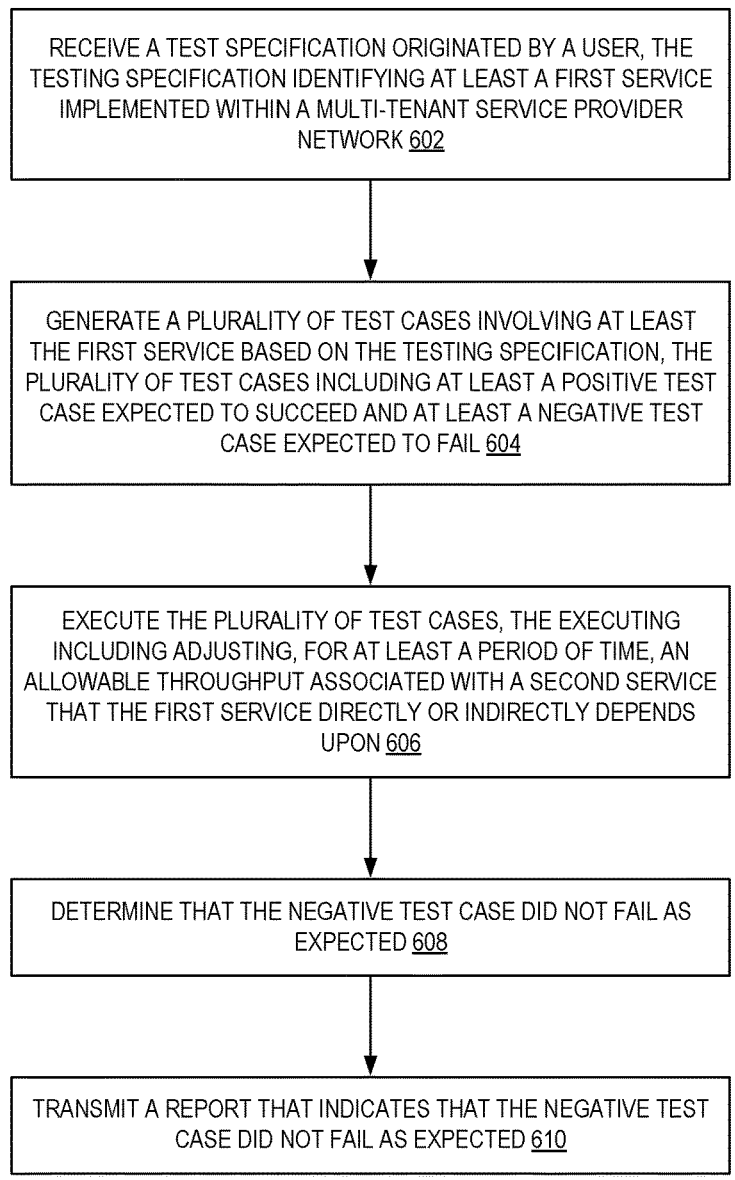
FIG. 6 is a flow diagram illustrating operations of a method for auto-intrusive data pattern and test case generation for negative service testing according to some embodiments.

FIG. 6 is a flow diagram illustrating operations 600 of a method for auto-intrusive data pattern and test case generation for negative service testing according to some embodiments. Some or all of the operations 600 (or other processes described herein, or variations, and/or combinations thereof) are performed under the control of one or more computer systems configured with executable instructions and are implemented as code (e.g., executable instructions, one or more computer programs, or one or more applications) executing collectively on one or more processors, by hardware or combinations thereof. The code is stored on a computer-readable storage medium, for example, in the form of a computer program comprising instructions executable by one or more processors. The computer-readable storage medium is non-transitory. In some embodiments, one or more (or all) of the operations 600 are performed by test execution service 118 of the other figures.

The operations 600 include, at block 602, receiving a test specification originated by a user, the test specification identifying at least a first service implemented within a multi-tenant service provider network. In some embodiments, the test specification further identifies one or multiple invalid inputs for the first service, and in some embodiments the test specification identifies one or more valid inputs for the first service.

The operations 600 further include, at block 604, generating a plurality of test cases involving at least the first service based on the test specification, the plurality of test cases including at least a positive test case expected to succeed and at least a negative test case expected to fail. In some embodiments, the test specification further identifies at least one valid input for the first service, and the positive test case is generated based on the at least one valid input. In some embodiments, the test specification identifies at least one invalid input for the first service, and the negative test case is generated based on the at least one invalid input. In some embodiments, the test specification identifies a second invalid input for the first service, and the plurality of test cases includes a second negative test case, generated based on the second invalid input, that is expected to fail.

In some embodiments, the plurality of test cases are to test a plurality of workflows, wherein the execution of a first test case of the plurality of test cases includes: transmitting a first request to the first service that is associated with a first workflow, causing the first service to send another request to the second service; receiving a first response from the first service; transmitting a second request to a third service associated with a second workflow; and receiving a second response from the third endpoint. In some embodiments, the first request includes valid input and is expected to succeed; and the second request includes invalid input, from the perspective of the third service, and is not expected to succeed.

The operations 600 further include, at block 606, executing the plurality of test cases, the executing including adjusting, for at least a period of time, an allowable throughput associated with a second service that the first service directly or indirectly depends upon. In some embodiments, the first service calls the second service directly, but in some embodiments the second service is called by a third service that was called by the first service, and so on.

In some embodiments, adjusting the allowable throughput between the first service and the second service comprises changing a maximum/burst transactions per second (TPS) value or an average/sustained TPS value associated with the second service.

The operations 600 further include, at block 608, determining that the negative test case did not fail as expected.

In some embodiments, determining that the negative test case did not fail as expected comprises identifying the second service as failing to operate correctly, and wherein the transmitting of the report includes sending the report to an endpoint, account, or storage location associated with the second service.

In some embodiments, the test specification includes an identifier of an exception or failure expected to be generated by the first service based on providing the at least one invalid input to the first service. In some embodiments, determining that the negative test case did not fail as expected includes determining that a response originated by the first service did not indicate the exception or failure.

The operations 600 further include, at block 610, transmitting a report that indicates that the negative test case did not fail as expected.

In some embodiments, transmitting the report comprises transmitting a message to the first service, the second service, or a user account associated with the first service or second service, wherein the message indicates that the first service or second service performed erroneously.

In some embodiments, transmitting the report comprises transmitting a message to a computing device associated with the user that originated the test specification, the message carrying data identifying the negative test case as not having failed as expected.

Figure 7:
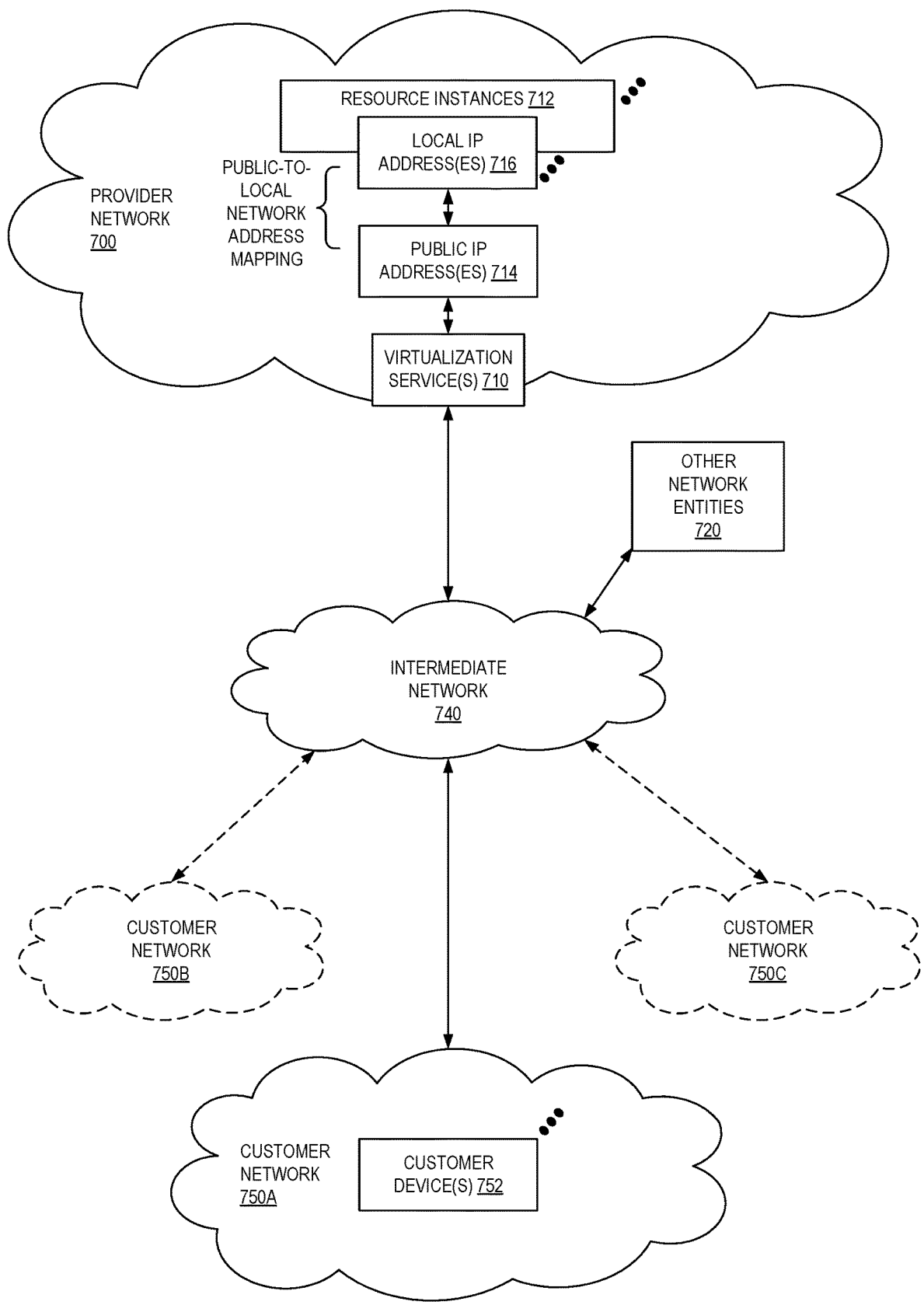
FIG. 7 illustrates an example provider network environment according to some embodiments.

FIG. 7 illustrates an example provider network (or "service provider system") environment according to some embodiments. A provider network 700 may provide resource virtualization to customers via one or more virtualization services 710 that allow customers to purchase, rent, or otherwise obtain instances 712 of virtualized resources, including but not limited to computation and storage resources, implemented on devices within the provider network or networks in one or more data centers. Local Internet Protocol (IP) addresses 716 may be associated with the resource instances 712; the local IP addresses are the internal network addresses of the resource instances 712 on the provider network 700. In some embodiments, the provider network 700 may also provide public IP addresses 714 and/or public IP address ranges (e.g., Internet Protocol version 4 (IPv4) or Internet Protocol version 6 (IPv6) addresses) that customers may obtain from the provider 700.

Conventionally, the provider network 700, via the virtualization services 710, may allow a customer of the service provider (e.g., a customer that operates one or more client networks 750A-750C including one or more customer device(s) 752) to dynamically associate at least some public IP addresses 714 assigned or allocated to the customer with particular resource instances 712 assigned to the customer. The provider network 700 may also allow the customer to remap a public IP address 714, previously mapped to one virtualized computing resource instance 712 allocated to the customer, to another virtualized computing resource instance 712 that is also allocated to the customer. Using the virtualized computing resource instances 712 and public IP addresses 714 provided by the service provider, a customer of the service provider such as the operator of customer network(s) 750A-750C may, for example, implement customer-specific applications and present the customer's applications on an intermediate network 740, such as the Internet. Other network entities 720 on the intermediate network 740 may then generate traffic to a destination public IP address 714 published by the customer network(s) 750A-750C; the traffic is routed to the service provider data center, and at the data center is routed, via a network substrate, to the local IP address 716 of the virtualized computing resource instance 712 currently mapped to the destination public IP address 714. Similarly, response traffic from the virtualized computing resource instance 712 may be routed via the network substrate back onto the intermediate network 740 to the source entity 720.

Local IP addresses, as used herein, refer to the internal or "private" network addresses, for example, of resource instances in a provider network. Local IP addresses can be within address blocks reserved by Internet Engineering Task Force (IETF) Request for Comments (RFC) 1918 and/or of an address format specified by IETF RFC 4193 and may be mutable within the provider network. Network traffic originating outside the provider network is not directly routed to local IP addresses; instead, the traffic uses public IP addresses that are mapped to the local IP addresses of the resource instances. The provider network may include networking devices or appliances that provide network address translation (NAT) or similar functionality to perform the mapping from public IP addresses to local IP addresses and vice versa.

Public IP addresses are Internet mutable network addresses that are assigned to resource instances, either by the service provider or by the customer. Traffic routed to a public IP address is translated, for example via 1:1 NAT, and forwarded to the respective local IP address of a resource instance.

Some public IP addresses may be assigned by the provider network infrastructure to particular resource instances; these public IP addresses may be referred to as standard public IP addresses, or simply standard IP addresses. In some embodiments, the mapping of a standard IP address to a local IP address of a resource instance is the default launch configuration for all resource instance types.

At least some public IP addresses may be allocated to or obtained by customers of the provider network 700; a customer may then assign their allocated public IP addresses to particular resource instances allocated to the customer. These public IP addresses may be referred to as customer public IP addresses, or simply customer IP addresses. Instead of being assigned by the provider network 700 to resource instances as in the case of standard IP addresses, customer IP addresses may be assigned to resource instances by the customers, for example via an API provided by the service provider. Unlike standard IP addresses, customer IP addresses are allocated to customer accounts and can be remapped to other resource instances by the respective customers as necessary or desired. A customer IP address is associated with a customer's account, not a particular resource instance, and the customer controls that IP address until the customer chooses to release it. Unlike conventional static IP addresses, customer IP addresses allow the customer to mask resource instance or availability zone failures by remapping the customer's public IP addresses to any resource instance associated with the customer's account.

The customer IP addresses, for example, enable a customer to engineer around problems with the customer's resource instances or software by remapping customer IP addresses to replacement resource instances.

Figure 8:
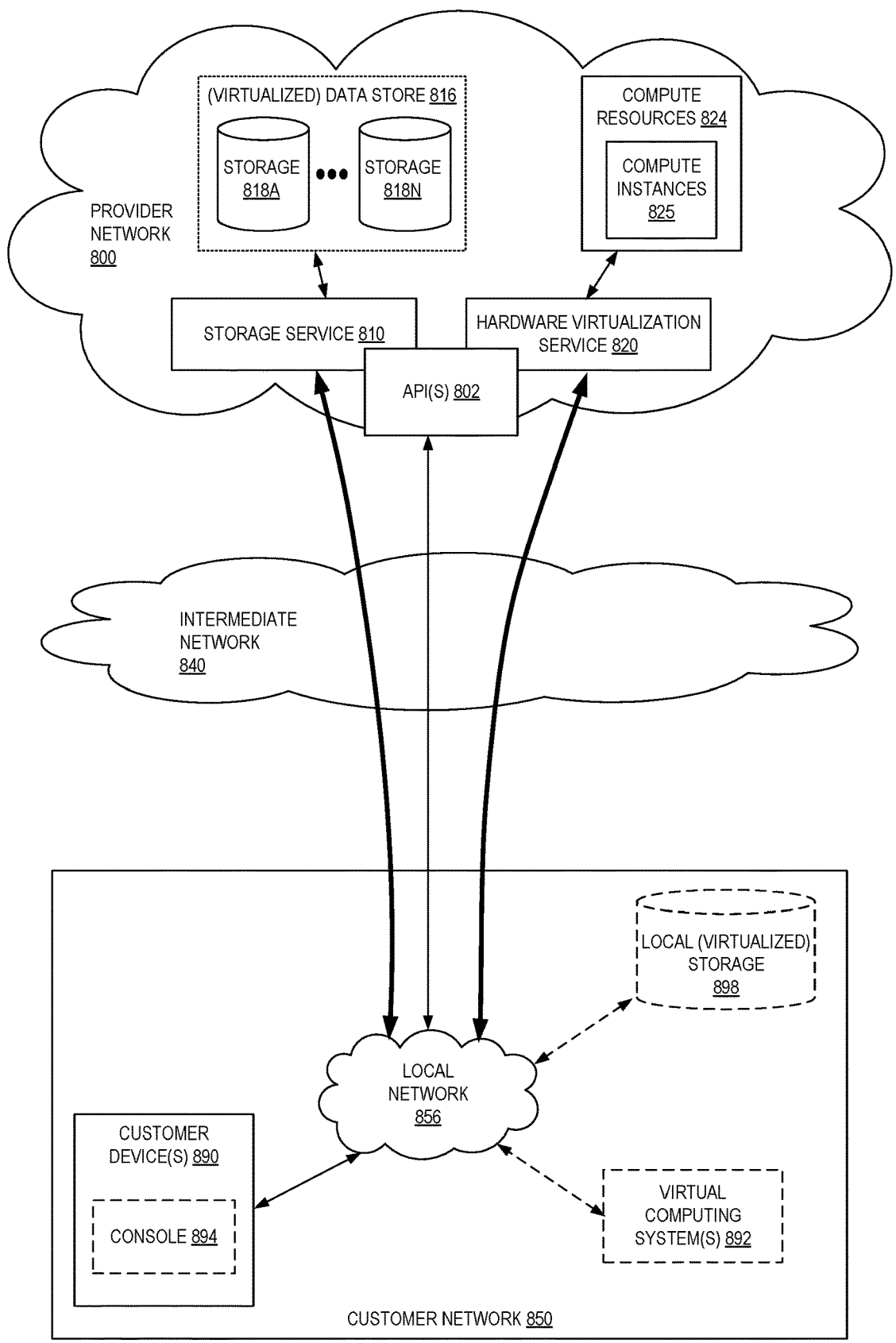
FIG. 8 is a block diagram of an example provider network that provides a storage service and a hardware virtualization service to customers according to some embodiments.

FIG. 8 is a block diagram of an example provider network that provides a storage service and a hardware virtualization service to customers, according to some embodiments. Hardware virtualization service 820 provides multiple compute resources 824 (e.g., compute instances 825 such as VMs) to customers. The compute resources 824 may, for example, be rented or leased to customers of the provider network 800 (e.g., to a customer that implements customer network 850). Each computation resource 824 may be provided with one or more local IP addresses. Provider network 800 may be configured to route packets from the local IP addresses of the compute resources 824 to public Internet destinations, and from public Internet sources to the local IP addresses of compute resources 824.

Provider network 800 may provide a customer network 850, for example coupled to intermediate network 840 via local network 856, the ability to implement virtual computing systems 892 via hardware virtualization service 820 coupled to intermediate network 840 and to provider network 800. In some embodiments, hardware virtualization service 820 may provide one or more APIs 802, for example a web services interface, via which a customer network 850 may access functionality provided by the hardware virtualization service 820, for example via a console 894 (e.g., a web-based application, standalone application, mobile application, etc.). In some embodiments, at the provider network 800, each virtual computing system 892 at customer network 850 may correspond to a computation resource 824 that is leased, rented, or otherwise provided to customer network 850.

From an instance of a virtual computing system 892 and/or another customer device 890 (e.g., via console 894), the customer may access the functionality of storage service 810, for example via one or more APIs 802, to access data from and store data to storage resources 818A-818N of a virtual data store 816 (e.g., a folder or "bucket", a virtualized volume, a database, etc.) provided by the provider network 800. In some embodiments, a virtualized data store gateway (not shown) may be provided at the customer network 850 that may locally cache at least some data, for example frequently-accessed or critical data, and that may communicate with storage service 810 via one or more communications channels to upload new or modified data from a local cache so that the primary store of data (virtualized data store 816) is maintained. In some embodiments, a user, via a virtual computing system 892 and/or on another customer device 890, may mount and access virtual data store 816 volumes via storage service 810 acting as a storage virtualization service, and these volumes may appear to the user as local (virtualized) storage 898.

Figure 9:
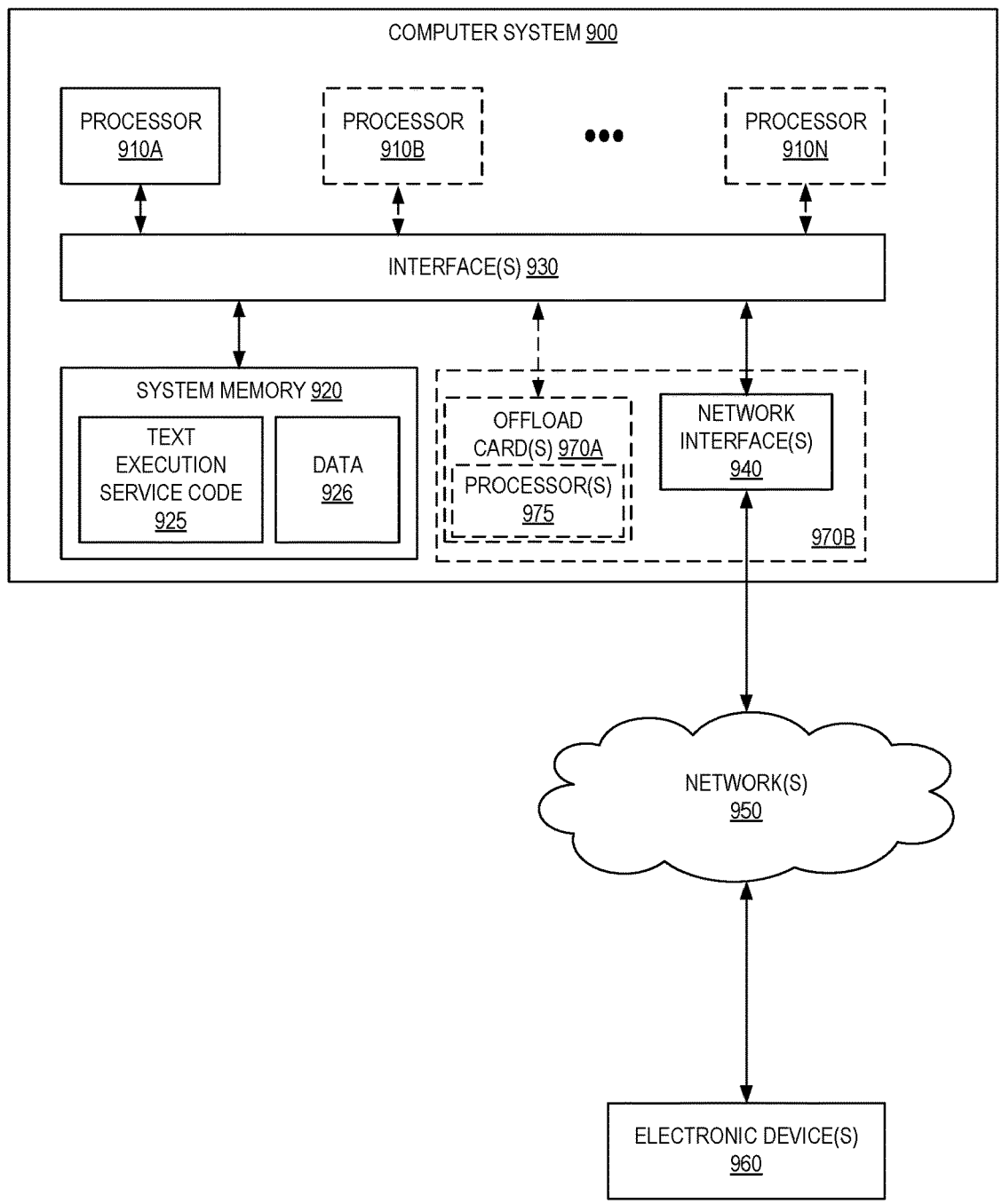
FIG. 9 is a block diagram illustrating an example computer system that may be used in some embodiments.

While not shown in FIG. 8, the virtualization service(s) may also be accessed from resource instances within the provider network 800 via API(s) 802. For example, a customer, appliance service provider, or other entity may access a virtualization service from within a respective virtual network on the provider network 800 via an API 802 to request allocation of one or more resource instances within the virtual network or within another virtual network.
Illustrative Systems In some embodiments, a system that implements a portion or all of the techniques described herein may include a general-purpose computer system that includes or is configured to access one or more computer-accessible media, such as computer system 900 illustrated in FIG. 9. In the illustrated embodiment, computer system 900 includes one or more processors 910 coupled to a system memory 920 via an input/output (I/O) interface 930. Computer system 900 further includes a network interface 940 coupled to I/O interface 930. While FIG. 9 shows computer system 900 as a single computing device, in various embodiments a computer system 900 may include one computing device or any number of computing devices configured to work together as a single computer system 900.

In various embodiments, computer system 900 may be a uniprocessor system including one processor 910, or a multiprocessor system including several processors 910 (e.g., two, four, eight, or another suitable number). Processors 910 may be any suitable processors capable of executing instructions. For example, in various embodiments, processors 910 may be general-purpose or embedded processors implementing any of a variety of instruction set architectures (ISAs), such as the x86, ARM, PowerPC, SPARC, or MIPS ISAs, or any other suitable ISA. In multiprocessor systems, each of processors 910 may commonly, but not necessarily, implement the same ISA.

System memory 920 may store instructions and data accessible by processor(s) 910. In various embodiments, system memory 920 may be implemented using any suitable memory technology, such as random-access memory (RAM), static RAM (SRAM), synchronous dynamic RAM (SDRAM), nonvolatile/Flash-type memory, or any other type of memory. In the illustrated embodiment, program instructions and data implementing one or more desired functions, such as those methods, techniques, and data described above are shown stored within system memory 920 as text execution service code 925 (e.g., executable to implement, in whole or in part, the test execution service 118) and data 926.

In one embodiment, I/O interface 930 may be configured to coordinate I/O traffic between processor 910, system memory 920, and any peripheral devices in the device, including network interface 940 or other peripheral interfaces. In some embodiments, I/O interface 930 may perform any necessary protocol, timing or other data transformations to convert data signals from one component (e.g., system memory 920) into a format suitable for use by another component (e.g., processor 910). In some embodiments, I/O interface 930 may include support for devices attached through various types of peripheral buses, such as a variant of the Peripheral Component Interconnect (PCI) bus standard or the Universal Serial Bus (USB) standard, for example. In some embodiments, the function of I/O interface 930 may be split into two or more separate components, such as a north bridge and a south bridge, for example. Also, in some embodiments some or all of the functionality of I/O interface 930, such as an interface to system memory 920, may be incorporated directly into processor 910.

Network interface 940 may be configured to allow data to be exchanged between computer system 900 and other devices 960 attached to a network or networks 950, such as other computer systems or devices as illustrated in FIG. 1, for example. In various embodiments, network interface 940 may support communication via any suitable wired or wireless general data networks, such as types of Ethernet network, for example. Additionally, network interface 940 may support communication via telecommunications/telephony networks such as analog voice networks or digital fiber communications networks, via storage area networks (SANs) such as Fibre Channel SANs, or via I/O any other suitable type of network and/or protocol.

In some embodiments, a computer system 900 includes one or more offload cards 970A or 970B (including one or more processors 975, and possibly including the one or more network interfaces 940) that are connected using an I/O interface 930 (e.g., a bus implementing a version of the Peripheral Component Interconnect-Express (PCI-E) standard, or another interconnect such as a QuickPath interconnect (QPI) or UltraPath interconnect (UPI)). For example, in some embodiments the computer system 900 may act as a host electronic device (e.g., operating as part of a hardware virtualization service) that hosts compute resources such as compute instances, and the one or more offload cards 970A or 970B execute a virtualization manager that can manage compute instances that execute on the host electronic device. As an example, in some embodiments the offload card(s) 970A or 970B can perform compute instance management operations such as pausing and/or un-pausing compute instances, launching and/or terminating compute instances, performing memory transfer/copying operations, etc. These management operations may, in some embodiments, be performed by the offload card(s) 970A or 970B in coordination with a hypervisor (e.g., upon a request from a hypervisor) that is executed by the other processors 910A-910N of the computer system 900. However, in some embodiments the virtualization manager implemented by the offload card(s) 970A or 970B can accommodate requests from other entities (e.g., from compute instances themselves), and may not coordinate with (or service) any separate hypervisor.

In some embodiments, system memory 920 may be one embodiment of a computer-accessible medium configured to store program instructions and data as described above. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computer system 900 via I/O interface 930. A non-transitory computer-accessible storage medium may also include any volatile or non-volatile media such as RAM (e.g., SDRAM, double data rate (DDR) SDRAM, SRAM, etc.), read only memory (ROM), etc., that may be included in some embodiments of computer system 900 as system memory 920 or another type of memory. Further, a computer-accessible medium may include transmission media or signals such as electrical, electromagnetic, or digital signals, conveyed via a communication medium such as a network and/or a wireless link, such as may be implemented via network interface 940.

Various embodiments discussed or suggested herein can be implemented in a wide variety of operating environments, which in some cases can include one or more user computers, computing devices, or processing devices which can be used to operate any of a number of applications. User or client devices can include any of a number of general-purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially available operating systems and other known applications for purposes such as development and database management. These devices also can include other electronic devices, such as dummy terminals, thin-clients, gaming systems, and/or other devices capable of communicating via a network.

Most embodiments utilize at least one network that would be familiar to those skilled in the art for supporting communications using any of a variety of widely-available protocols, such as Transmission Control Protocol/Internet Protocol (TCP/IP), File Transfer Protocol (FTP), Universal Plug and Play (UPnP), Network File System (NFS), Common Internet File System (CIFS), Extensible Messaging and Presence Protocol (XMPP), AppleTalk, etc. The network(s) can include, for example, a local area network (LAN), a wide-area network (WAN), a virtual private network (VPN), the Internet, an intranet, an extranet, a public switched telephone network (PSTN), an infrared network, a wireless network, and any combination thereof.

In embodiments utilizing a web server, the web server can run any of a variety of server or mid-tier applications, including HTTP servers, File Transfer Protocol (FTP) servers, Common Gateway Interface (CGI) servers, data servers, Java servers, business application servers, etc. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, PHP, or TCL, as well as combinations thereof. The server(s) may also include database servers, including without limitation those commercially available from Oracle®, Microsoft®, Sybase®, IBM®, etc. The database servers may be relational or non-relational (e.g., "NoSQL"), distributed or non-distributed, etc.

Environments disclosed herein can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and/or at least one output device (e.g., a display device, printer, or speaker). Such a system may also include one or more storage devices, such as disk drives, optical storage devices, and solid-state storage devices such as random-access memory (RAM) or read-only memory (ROM), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory (EEPROM), flash memory or other memory technology, Compact Disc-Read Only Memory (CD-ROM), Digital Versatile Disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

In the preceding description, various embodiments are described. For purposes of explanation, specific configurations and details are set forth to provide a thorough understanding of the embodiments. However, it will also be apparent to one skilled in the art that the embodiments may be practiced without the specific details. Furthermore, well-known features may be omitted or simplified in order not to obscure the embodiment being described.

Bracketed text and blocks with dashed borders (e.g., large dashes, small dashes, dot-dash, and dots) are used herein to illustrate optional operations that add additional features to some embodiments. However, such notation should not be taken to mean that these are the only options or optional operations, and/or that blocks with solid borders are not optional in some embodiments.

Reference numerals with suffix letters (e.g., 818A-818N) may be used to indicate that there can be one or multiple instances of the referenced entity in various embodiments, and when there are multiple instances, each does not need to be identical but may instead share some general traits or act in common ways. Further, the particular suffixes used are not meant to imply that a particular amount of the entity exists unless specifically indicated to the contrary. Thus, two entities using the same or different suffix letters may or may not have the same number of instances in various embodiments.

References to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Moreover, in the various embodiments described above, unless specifically noted otherwise, disjunctive language such as the phrase "at least one of A, B, or C" is intended to be understood to mean either A, B, or C, or any combination thereof (e.g., A, B, and/or C). As such, disjunctive language is not intended to, nor should it be understood to, imply that a given embodiment requires at least one of A, at least one of B, or at least one of C to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A computer-implemented method comprising:
   receiving a test specification originated by a user, the test specification identifying a first invalid input for a first service implemented within a multi-tenant service provider network, a first valid input for the first service, and an expected exception or error expected to be passed back from the first service in response to sending a request to the first service that includes the first invalid input;
   generating a plurality of test cases involving at least the first service based on the test specification, the plurality of test cases including at least a positive test case expected to succeed and at least a negative test case expected to fail;
   executing the plurality of test cases, the executing for the at least one negative test case including adjusting down, for at least a period of time, an allowable throughput associated with another service that the first service directly or indirectly depends upon, the adjusting down the allowable throughput to cause the first service to perform in an erroneous manner, wherein adjusting the allowable throughput comprises changing a burst transactions per second (TPS) or a sustained TPS associated with another service;
   determining, based on a response received from the first service during the executing of the plurality of test cases, that the negative test case did not fail as expected, the determining including determining that the response does not identify the exception or error; and
   transmitting a report that indicates that the negative test case did not fail as expected, wherein the report identifies the first service as having a fault and further identifies the negative test case.

2. The computer-implemented method of claim 1, wherein the plurality of test cases are to test a plurality of workflows, wherein the execution of a first test case of the plurality of test cases includes:
   transmitting a first request to the first service that is associated with a first workflow, causing the first service to send another request to a second service;
   receiving a first response from the first service;
   transmitting a second request to a third service associated with a second workflow; and
   receiving a second response from the third service.

3. A computer-implemented method comprising:
receiving a test specification originated by a user, the test specification identifying at least a first service implemented within a multi-tenant service provider network;
generating a plurality of test cases involving at least the first service based on the test specification, the plurality of test cases including at least a positive test case expected to succeed and one or more negative test cases expected to fail;
executing the plurality of test cases, the executing for at least a first negative test case including adjusting down, for at least a period of time, an allowable throughput associated with a second service that the first service directly or indirectly depends upon, the adjusting down the allowable throughput to cause the first service to perform in an erroneous manner, wherein adjusting down the allowable throughput comprises changing a burst transactions per second (TPS) or a sustained TPS associated with the second service;
determining that the first negative test case did not fail as expected; and
transmitting a report that indicates that the first negative test case did not fail as expected.

4. The computer-implemented method of claim 3, wherein the test specification further identifies at least one invalid input for the first service, wherein a second negative test case is generated based on the one invalid input.

5. The computer-implemented method of claim 4, wherein the test specification further identifies a second invalid input for the first service, and wherein the plurality of test cases includes a third negative test case that is expected to fail.

6. The computer-implemented method of claim 4, wherein:
the test specification includes an identifier of an exception or failure expected to be generated by the first service based on providing the at least one invalid input to the first service.

7. The computer-implemented method of claim 6, further comprising determining that the second negative test case did not fail as expected, wherein the determining that the second negative test case did not fail as expected includes determining that a response originated by the first service did not indicate the exception or failure.

8. The computer-implemented method of claim 3, wherein the plurality of test cases are to test a plurality of workflows, wherein the execution of a first test case of the plurality of test cases includes:
transmitting a first request to the first service that is associated with a first workflow, causing the first service to send another request to the second service;
receiving a first response from the first service;
transmitting a second request to a third service associated with a second workflow; and
receiving a second response from the third endpoint.

9. The computer-implemented method of claim 8, wherein:
the first request includes valid input and is expected to succeed; and
the second request includes invalid input, from the perspective of the third service, and is not expected to succeed.

10. The computer-implemented method of claim 3, wherein transmitting the report comprises transmitting a message to the first service, the second service, or a user account associated with the first service or second service, wherein the message indicates that the first service or the second service performed erroneously.

11. The computer-implemented method of claim 3, wherein transmitting the report comprises transmitting a message to a computing device associated with the user that originated the test specification, the message carrying data identifying the first negative test case as not having failed as expected.

12. The computer-implemented method of claim 3, wherein determining that the first negative test case did not fail as expected comprises identifying the second service as failing to operate correctly, and wherein the transmitting of the report includes sending the report to an endpoint, account, or storage location associated with the second service.

13. A system comprising:
a first one or more electronic devices to implement a plurality of services in a multi-tenant provider network; and
a second one or more electronic devices to implement a test execution service in the multi-tenant provider network, the test execution service including instructions that upon execution cause the test execution service to:
receive a test specification originated by a user, the test specification identifying at least a first service of the plurality of services;
generate a plurality of test cases involving at least the first service based on the test specification, the plurality of test cases including at least a positive test case expected to succeed and one or more negative test cases expected to fail;
execute the plurality of test cases, the execution of at least a first negative test case including an adjustment down, for at least a period of time, of an allowable throughput associated with a second service that the first service directly or indirectly depends upon, the adjustment down of the allowable throughput to cause the first service to perform in an erroneous manner wherein the adjustment down comprises changing a burst transactions per second (TPS) or a sustained TPS associated with the second service;
determine that the first negative test case did not fail as expected; and
transmit a report that indicates that the first negative test case did not fail as expected.

14. The system of claim 13, wherein the test specification further identifies at least one invalid input for the first service, wherein a second negative test case is generated based on the one invalid input.

15. The system of claim 14, wherein the test specification further identifies a second invalid input for the first service, and wherein the plurality of test cases includes a third negative test case generated based on the second invalid input that is expected to fail.

16. The system of claim 14, wherein the test specification includes an identifier of an exception or failure expected to be generated by the first service based on providing the at least one invalid input to the first service.

17. The system of claim 16, wherein the test execution service includes further instructions that upon execution cause the test execution service to determine that the second negative test case did not fail as expected, wherein to determine that the second negative test did not fail as expected, the test execution service is to determine that a response originated by the first service did not indicate the exception or failure.

\* \* \* \* \*